US010791240B2

(12) United States Patent
Majoros et al.

(10) Patent No.: US 10,791,240 B2
(45) Date of Patent: Sep. 29, 2020

(54) SYSTEMS AND METHODS FOR RENDERING A SECURE DOCUMENT WITH A TEXT SELECTION CAPABILITY

(71) Applicant: Citrix Systems, Inc., Fort Lauderdale, FL (US)

(72) Inventors: Attila Majoros, Chalfont St Peter (GB); Pulkit Gupta, Raleigh, NC (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 189 days.

(21) Appl. No.: 15/602,613

(22) Filed: May 23, 2017

(65) Prior Publication Data

US 2018/0342038 A1    Nov. 29, 2018

(51) Int. Cl.
*H04N 1/32* (2006.01)
*G06F 40/166* (2020.01)
*G06T 1/00* (2006.01)
*G06T 11/60* (2006.01)

(52) U.S. Cl.
CPC ....... *H04N 1/32267* (2013.01); *G06F 40/166* (2020.01); *H04N 2201/3233* (2013.01)

(58) Field of Classification Search
CPC ........ G06F 17/211; G06F 21/10; G06F 17/00; G06F 17/21; G06F 3/1222; G06F 3/1238
USPC ......................................................... 715/201
See application file for complete search history.

(56) References Cited

U.S. PATENT DOCUMENTS

| | | | | |
|---|---|---|---|---|
| 7,072,052 B1 * | 7/2006 | Tanahashi | .............. | G06K 15/02 358/1.1 |
| 2002/0126869 A1 * | 9/2002 | Wang | .................... | G06T 1/0021 382/100 |
| 2007/0089053 A1 * | 4/2007 | Uhlig | .................... | G06F 3/1297 715/255 |
| 2011/0185179 A1 * | 7/2011 | Swaminathan | ......... | G06F 21/10 713/176 |
| 2015/0310188 A1 * | 10/2015 | Ford | ................... | H04L 63/0428 726/28 |
| 2016/0035060 A1 * | 2/2016 | Lahmi | ................... | G06T 1/0028 382/100 |
| 2017/0329943 A1 * | 11/2017 | Choi | ..................... | G06F 21/602 |

* cited by examiner

*Primary Examiner* — Ariel Mercado
(74) *Attorney, Agent, or Firm* — Fox Rothschild LLP; Robert J. Sacco; Carol E. Thorstad-Forsyth

(57) ABSTRACT

Systems and methods for rendering a secure document with a text selection capability. The methods comprise: performing first operations, by a computing device, to determine which objects of a source document are non-text objects; creating, by the computing device, an image file representing a graphic consisting of the non-text objects of the source document and a watermark merged together as a single image; drawing the graphic represented by the image file to a base document having a first file format different than a second file format of the source document; and drawing text objects to the base document from the source document so as to create the secure document with the text selection capability.

24 Claims, 6 Drawing Sheets

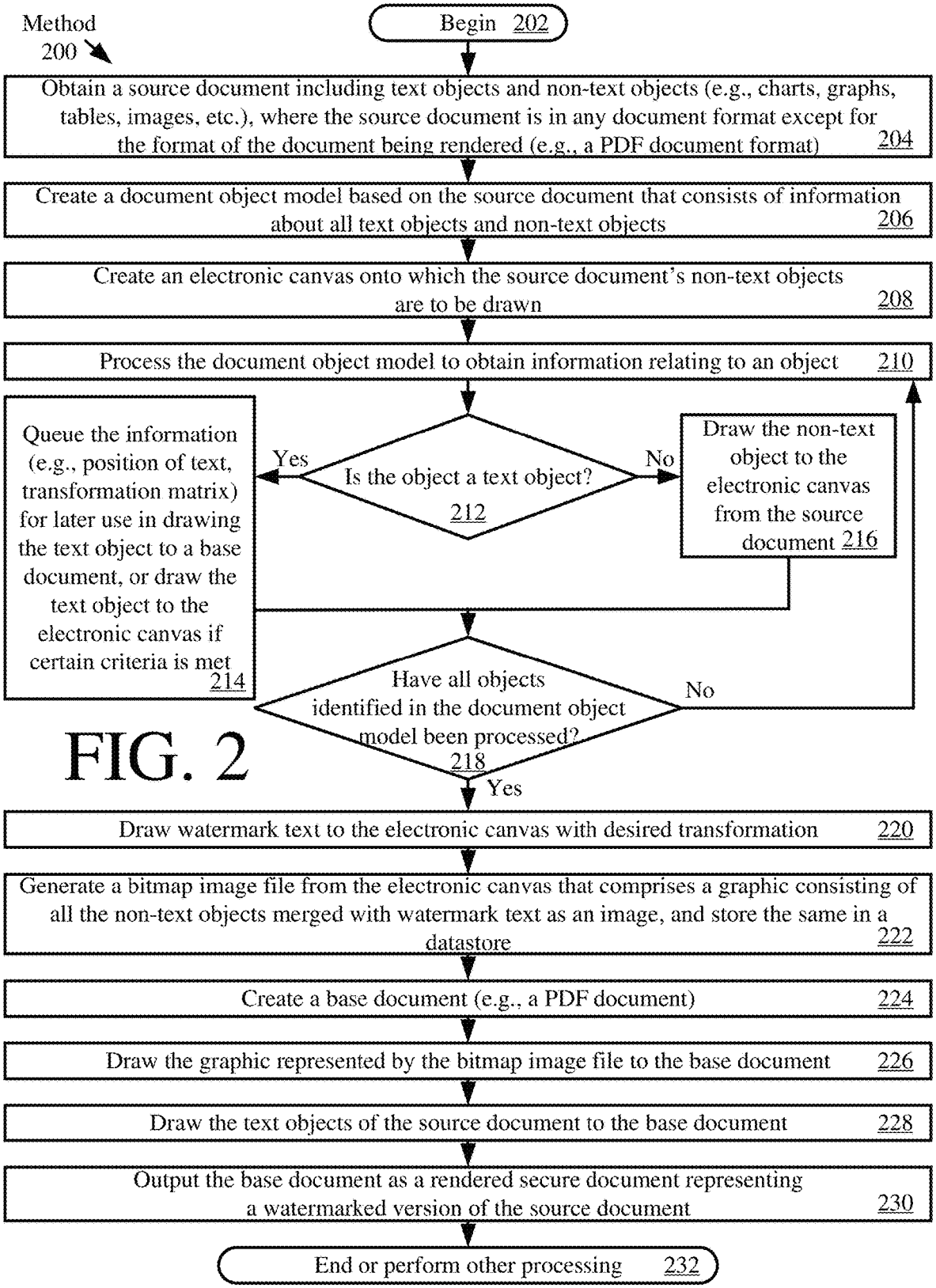

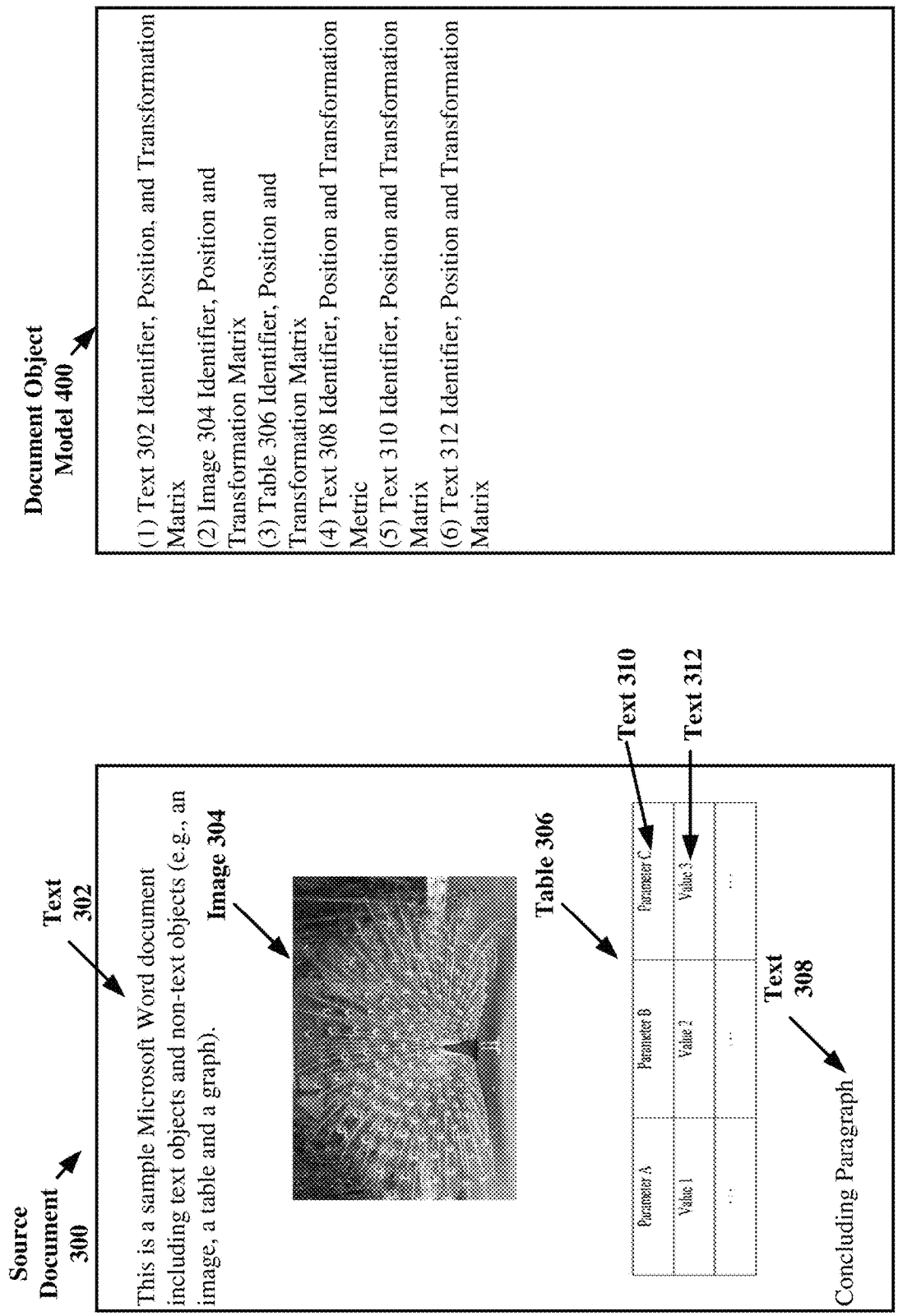

Base Document 700"
This is a sample Microsoft Word document including text objects and non-text objects (e.g., an image, a table and a graph).
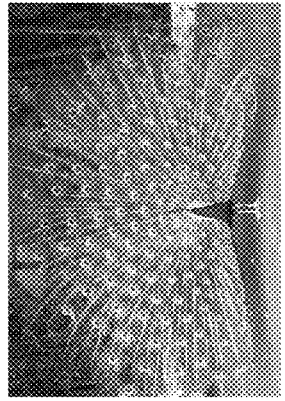
| Parameter A | Parameter B | Parameter C |
|---|---|---|
| Value 1 | Value 2 | Value 3 |
| ... | ... | ... |
Concluding Paragraph          Watermark Text
FIG. 9
Base Document 700'
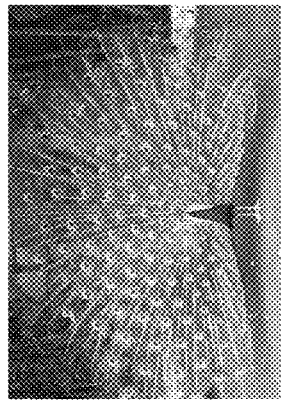
| | | |
|---|---|---|
| | | |
| | | |
Watermark Text
FIG. 8

SYSTEMS AND METHODS FOR RENDERING A SECURE DOCUMENT WITH A TEXT SELECTION CAPABILITY

BACKGROUND

Statement of the Technical Field

The present disclosure relates generally to computing systems. More particularly, the present disclosure relates to implementing systems and methods for rendering a secure document with a text selection capability.

Description of the Related Art

Existing image-based renderers generate images from documents. The rendered images do not differentiate between text and non-text objects. Accordingly, every component of a source document is rendered as a single bitmap image file. This type of rendering provides the option of including a textual watermark (e.g., copyright information) as part of the image represented by the bitmap image file. In this case, the textual watermarks provide a satisfactory means for securing the rendered images (e.g., for copyrights purposes).

Existing Portable Document Format ("PDF")-based renderers generate PDF documents from non-PDF source documents. The rendered PDF documents provide a text selection capability at the client's end (i.e., the capability for a user to select text in a PDF document via user-software interactions for purposes of highlighting text, crossing out text, and/or underlining text). This is possible because text is drawn as text into the PDF documents. The term "drawn", as used here, means to combine or merge an object into a document as a graphical representation. For example, in some scenarios, the object is merged into the document by creating a bitmap image file therefore inserting the image into the PDF document. Non-text elements (e.g., charts, graphs, tables, images, etc.) are respectively drawn into specific object types per PDF specifications (e.g., each table is rendered as a table per PDF specification, each image is rendered as an image per PDF specification, etc.). In order to secure the PDF documents, watermarks can be applied to the PDF documents as text or as a separate image in the PDF document. However, since the watermarks include separate text (in the case of text based watermarking) or separate images (in the case of image based watermarking), the watermarks are separate independent objects without any intermingling with other objects. As such, it is quite easy to remove the watermarks from the PDF documents. Thus, the watermarks do not provide a satisfactory means for securing the PDF documents (e.g., for copyrights purposes). Accordingly, sophisticated techniques (like digital signing) is often used to address this issue of the PDF documents.

SUMMARY

Implementing systems and methods are described herein for rendering a secure document with a text selection capability. The method comprises: performing first operations, by a computing device, to determine which objects of a source document are non-text objects and which objects of the source document are text objects; creating, by the computing device, an image file (e.g., bitmap image file) representing a graphic consisting of the non-text objects of the source document and a watermark (e.g., a textual watermark) merged together as a single image (e.g., a digital image or bitmap image); drawing the graphic represented by the image file to a base document having a first file format (e.g., a PDF format) different than a second file format (e.g., a Microsoft Word format) of the source document; and drawing text objects to the base document from the source document so as to create the secure document with the text selection capability.

In some scenarios, the first operations comprise: creating, by the computing device, a document object model that consists of information about objects of a source document; and processing, by the computing device, the document object model to determine which objects of the source document are non-text objects. The information includes, but is not limited to, an object identifier, an object position in the source document, and a transformation matrix. Information of the document object model which relates to the text objects of the source document may be queued prior to when the graphic is drawn to the base document. This queued information is then used to draw text objects to the base document.

In those or other scenarios, the bitmap image file is created by: drawing the non-text objects to an electronic canvas from the source document; drawing the watermark to the electronic canvas; and storing a bitmap digital image of the electronic canvas consisting of the non-text images and watermark merged together as the single image.

In those or other scenarios, the text objects are drawn to the base document in a one-object-at-a-time manner. The order in which the text objects are drawn to the base document can be determined based on queued information from a document object model.

BRIEF DESCRIPTION OF THE DRAWINGS

Embodiments will be described with reference to the following drawing figures, in which like numerals represent like items throughout the figures.

FIG. 2 is a flow diagram of an illustrative method for secure document rendering with a text selection capability.

FIG. 3 is an illustration of an illustrative source document.

FIG. 4 is an illustration of an illustrative document object model.

FIG. 8 is an illustration of the illustrative base document of FIG. 7 with a graphic (containing non-text objects of the source document shown in FIG. 3 and watermark text) drawn thereto.

FIG. 9 is an illustration of the illustrative base document of FIG. 7 with text objects of the source document shown in FIG. 3 drawn thereto.

DETAILED DESCRIPTION

Figure 1:
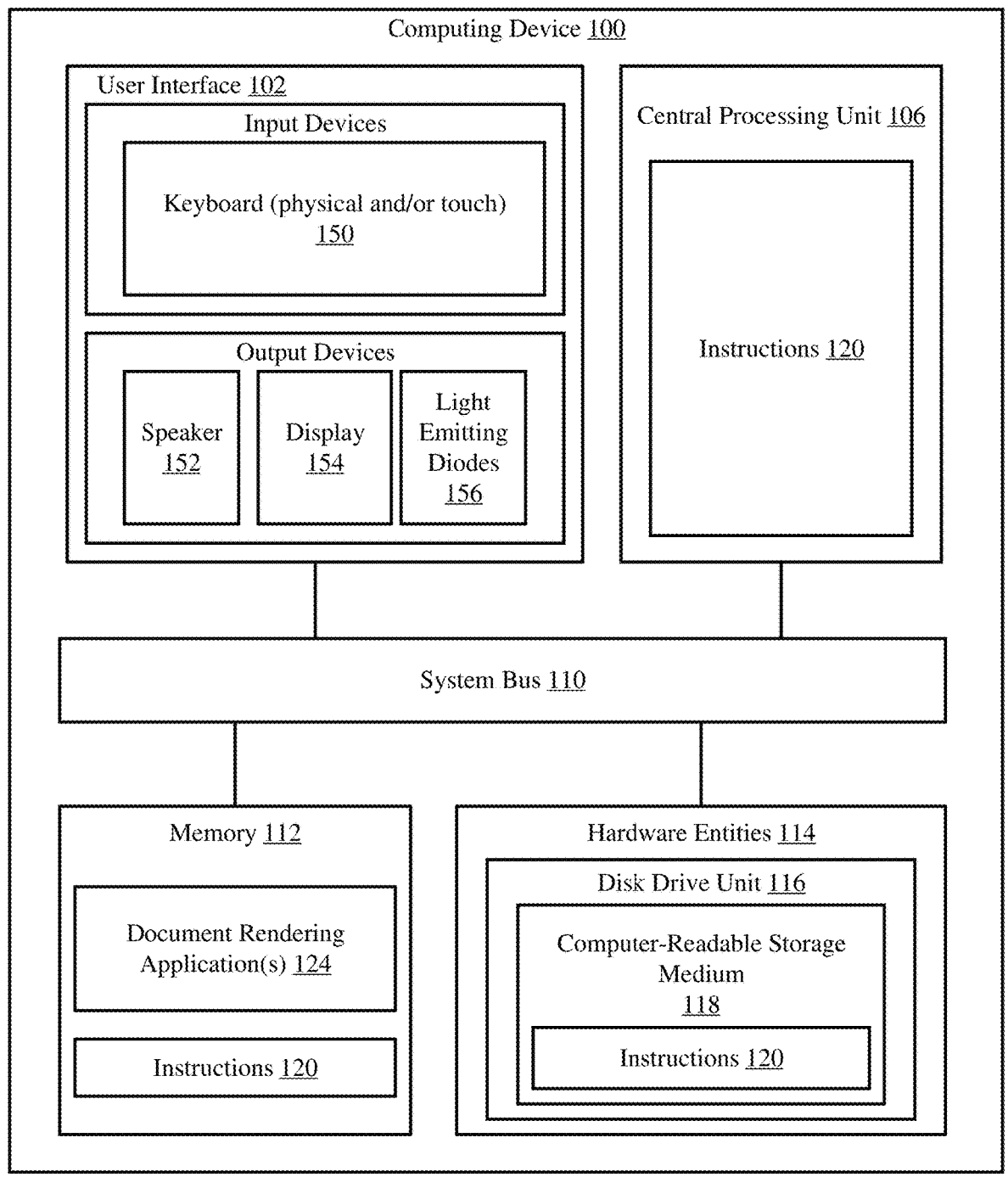
FIG. 1 is an illustration of an illustrative architecture for a computing device.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution takes an innovative approach to document rendering. The innovative approach involves: drawing text of a source document (e.g., Microsoft Office document) as text on a page in a base document (e.g., a PDF document); and drawing all other components (e.g., non-text content (such as charts, graphs, tables, images, etc.) and/or watermarking text) of the source document into an electronic canvas from which a single digital image represented by a bitmap image file is created. In effect, the present solution provides rendered documents with built-in security and a text selection capability at the client's end. The text selection capability can allow a user to select text in a PDF document via user-software interactions. The user may select text for various purposes such as highlighting text, crossing out text, and/or underlining text.

The present solution will be described herein in relation to scenarios in which PDF is the default output document type. The present solution is not limited in this regard. Other document types can be used as the default output document type. Accordingly, the present solution can be used to render any source document into any target document type which supports the drawing of text and images thereto.

The present solution can be employed in a variety of applications. More specifically, the present solution can be used in all scenarios where there is a need for rendering documents, a need for a client side text selection capability, and/or a need for document integrity.

Notably, the present solution overcomes various drawbacks of the conventional image-based renderers and PDF-based renderers described in the background section of this document. In this regard, it should be understood that the present solution provides secure watermarking without any need of sophisticated solutions (e.g., digital signing), as well as a text selection capability at the client's end.

Conventionally, watermarks are added as a text or image layer on a rendered document during a PDF document rendering process. These watermarks are easy to remove. As such, there are a number of solutions that exists to remove watermarks from PDF documents. The present solution overcomes this drawback of conventional PDF document renderers by (a) merging a watermark (which may be textual) with non-text elements of a document during document conversion and (b) rendering the non-text elements and watermark as a single digital image represented by a bitmap image file. By performing operations (a) and (b), the removal of the watermarks from rendered documents (e.g., PDF documents) becomes much more difficult since the watermarks are embedded as part of the same image comprising the rendered non-text elements.

Conventional PDF document renderers separately map each non-text element from a source document to a target document (i.e., a PDF document). In contrast, the present solution combines all non-text elements and renders them into a single bitmap image file along with a security element (e.g., watermarking text) so that all of the non-text elements merge together to become a single element in a rendered PDF document. This provides PDF documents with satisfactory security as well as a text selection capability without the need of any sophisticated security solutions (e.g., digital signatures).

Referring now to FIG. 1, there is provided an illustration of an illustrative computing device 100. Computing device 100 may include more or less components than those shown in FIG. 1. However, the components shown are sufficient to disclose an illustrative embodiment implementing the present solution. The hardware architecture of FIG. 1 represents one embodiment of a representative computing device configured to provide secure document rendering with a text selection capability as described herein. As such, the computing device 100 of FIG. 1 implements at least a portion of the method(s) described herein.

Some or all the components of the computing device 100 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 1, the computing device 100 comprises a user interface 102, a Central Processing Unit ("CPU") 106, a system bus 110, a memory 112 connected to and accessible by other portions of computing device 100 through system bus 110, and hardware entities 114 connected to system bus 110. The user interface can include input devices and output devices, which facilitate user-software interactions for controlling operations of the computing device 100. The input devices include, but are not limited, a physical and/or touch keyboard 150. The input devices can be connected to the computing device 100 via a wired or wireless connection (e.g., a Bluetooth® connection). The output devices include, but are not limited to, a speaker 152, a display 154, and/or light emitting diodes 156.

At least some of the hardware entities 114 perform actions involving access to and use of memory 112, which can be a Radom Access Memory ("RAM"), a disk driver and/or a Compact Disc Read Only Memory ("CD-ROM"). Hardware entities 114 can include a disk drive unit 116 comprising a computer-readable storage medium 118 on which is stored one or more sets of instructions 120 (e.g., software code) configured to implement one or more of the methodologies, procedures, or functions described herein. The instructions 120 can also reside, completely or at least partially, within the memory 112 and/or within the CPU 106 during execution thereof by the computing device 100. The memory 112 and the CPU 106 also can constitute machine-readable media. The term "machine-readable media", as used here, refers to a single medium or multiple media (e.g., a centralized or distributed database, and/or associated caches and servers) that store the one or more sets of instructions 120. The term "machine-readable media", as used here, also refers to any medium that is capable of storing, encoding or carrying a set of instructions 120 for execution by the computing device 100 and that cause the computing device 100 to perform any one or more of the methodologies of the present disclosure.

In some scenarios, the hardware entities 114 include an electronic circuit (e.g., a processor) programmed for facilitating the prevention of service disruptions during operating system updates. In this regard, it should be understood that the electronic circuit can access and run document rendering application(s) 124 installed on the computing device 100. The functions of the document rendering application(s) 124 are apparent from the following discussion of the present solution. For example, the document rendering application(s) 124 is(are) configured to perform one or more of the operations described below in relation to FIG. 2.

Referring now to FIG. 2, there is provided a flow diagram of an illustrative method 200 for secure document rendering with a text selection capability. All of the operations 204-232 of FIG. 2 are performed by a computing device (e.g., computing device 100 of FIG. 1) executing a document rendering software application (e.g., document rendering application(s) 124 of FIG. 1).

Method 200 begins with 202 and continues with 204 where a source document is obtained. The source document includes text objects and non-text objects (e.g., charts, graphs, tables, images, etc.). The source document is in any document format except for the format of the document being rendered. In some scenarios, the source document is in a Microsoft Word format and the rendered document is in a PDF format. Microsoft Word documents and PDF documents are well known in the art, and therefore will not be described herein.

An illustration of an illustrative source document 300 is provided in FIG. 3. As shown in FIG. 3, the source document 300 comprises text objects 302, 308, 309 and non-text objects 304, 306. Each text object is a specific instance of a human-readable sequence of characters (e.g., a sentence 302, a phrase 308, a word 310, or a value 312). Each non-text object is a specific instance of non-text content (e.g., an image 304, a table 306, a chart, a graph, etc.). The present solution is not limited to the particulars of source document 300. The source document can include any number and type(s) of objects in accordance with a particular application.

Referring again to FIG. 2, method 200 continues with 206 where a document object model is created based on the source document 300. The document object model consists of information about all text objects and non-text objects of the source document. A schematic illustration of an illustrative document object model 400 is provided in FIG. 4. The document object model 400 comprises information about text objects 302 and 308 of FIG. 3, as well as non-text objects 304 and 306 of FIG. 3. This information can include, but is not limited to, object identifiers, object positions within the source document, and/or transformation matrixes for the objects of the source document. The transformation matrixes comprise information pertaining to size, color, effects and/or other characteristics (e.g., a length, a width, a font size, a font type, a font style, a font color, line spacing, indentation, effects (e.g., shadow)).

Figure 5:
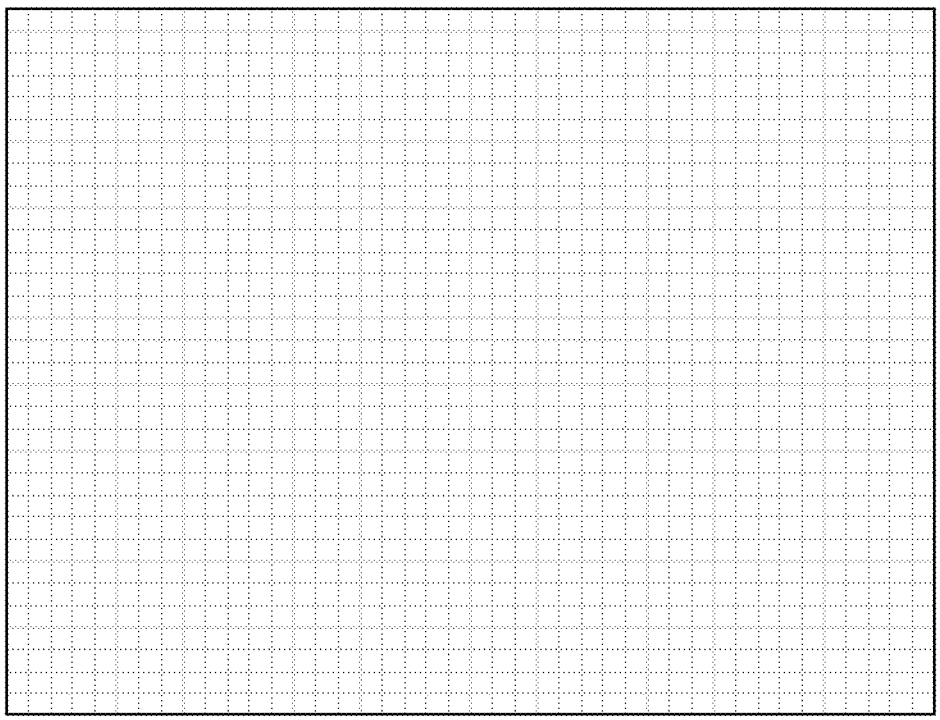
FIG. 5 is an illustration of an illustrative electronic canvas.

In 208, an electronic canvas is created onto which the source document's non-text objects are to be drawn. Electronic canvases are well known in the art, and therefore will not be described in detail herein. Still, it should be mentioned that the electronic canvas refers to a container that holds elements (e.g., lines, shapes, frames containing other elements, images, etc.). The container provides a means to store objects in an organized way that follows specific rules. An illustration of an illustrative electronic canvas 500 is provided in FIG. 5. The electronic canvas 500 is shown as an area in which a graphical picture is created and/or edited. The window may include a grid to facilitate proper placement of objects relative to each other or a reference point. The present solution is not limited in this regard. In some scenarios, the electronic canvas 500 is absent of a grid.

Once the electronic canvas has been created, 210 is performed where the document object model is processed to obtain information relating to an object of the source document. If the information indicates that the object is a text object [212:YES], then 214 is performed. In some scenarios, 214 involves queuing the information (e.g., an object's identifier, position and a transformation matrix) for later user when drawing the text objects to a base document. In other scenarios, it is desirable to selectively include certain text objects in the bitmap image along with the non-text images and watermark. In this case, the text object is selectively drawn to the electronic canvas if certain criteria is met. For example, the text object is selectively drawn to the electronic canvas when (a) the text object's level of importance and/or priority level are(is) respectively equal to or higher than threshold value(s), and/or (b) the text object relays confidential information. The present solution is not limited to the particulars of this example.

Figure 6:
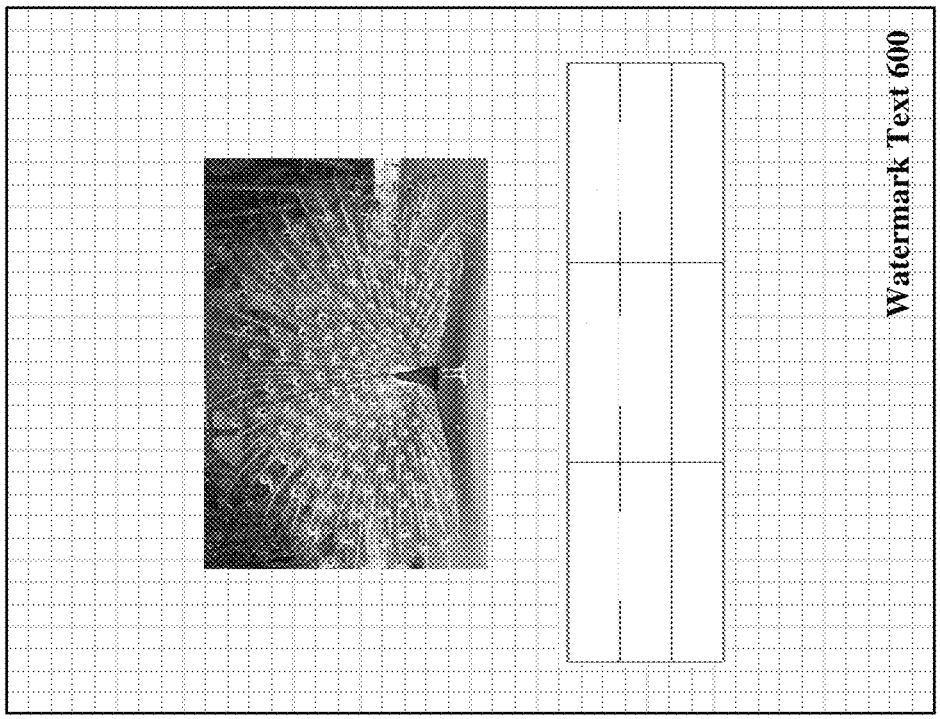
FIG. 6 is an illustration of the illustrative electronic canvas of FIG. 5 with non-text objects of a source document drawn thereto.

If the information indicates that the object is a non-text object [212:NO], then the non-text object is drawn on the electronic canvas from the source document. An illustration of the non-text objects 304, 306 of FIG. 3 drawn on the electronic canvas 500 is provided in FIG. 6. Notably, the lines of table 306 are drawn to the electronic canvas, but the textual content has not been drawn to the electronic canvas. A similar approach is employed for graphs, charts, etc.

Upon completing 214 or 216, 218 is performed where a determination is made as to whether or not all of the objects identified in the document object model have been processed. If all of the objects have not been processed [218: NO], then method 200 returns to 210 so that another iteration of 210-216 is performed for the next object identified in the document object model. If all of the objects have been processed [218:YES], then method 200 continues with operations of 220-230 for rending a document in a particular format (e.g., a PDF format).

In 220, watermark text is drawn on the electronic canvas. The watermark text can include, but is not limited to, copyright information and/or a unique code (e.g., a barcode or sequence of numbers and/or symbols uniquely identifying the document). An illustration of watermark text 600 drawn on the electronic canvas 500 is provided in FIG. 6. Thereafter in 222, a bitmap image file is generated from the electronic canvas and stored in a datastore (e.g., memory 112 of FIG. 1). The bitmap image file is generated by storing a bitmap digital image of the electronic canvas. The bitmap digital image comprises a representation of a graphic that corresponds to one or more bits of information. The graphic consists of all of the non-text objects of the source document merged with a watermark (e.g., a textual watermark). Techniques for generating digital images and bitmap image files are well known in the art, and therefore will not be described herein. Any known or to be known technique for generating digital images and/or bitmap image files can be used herein without limitation.

Figure 7:
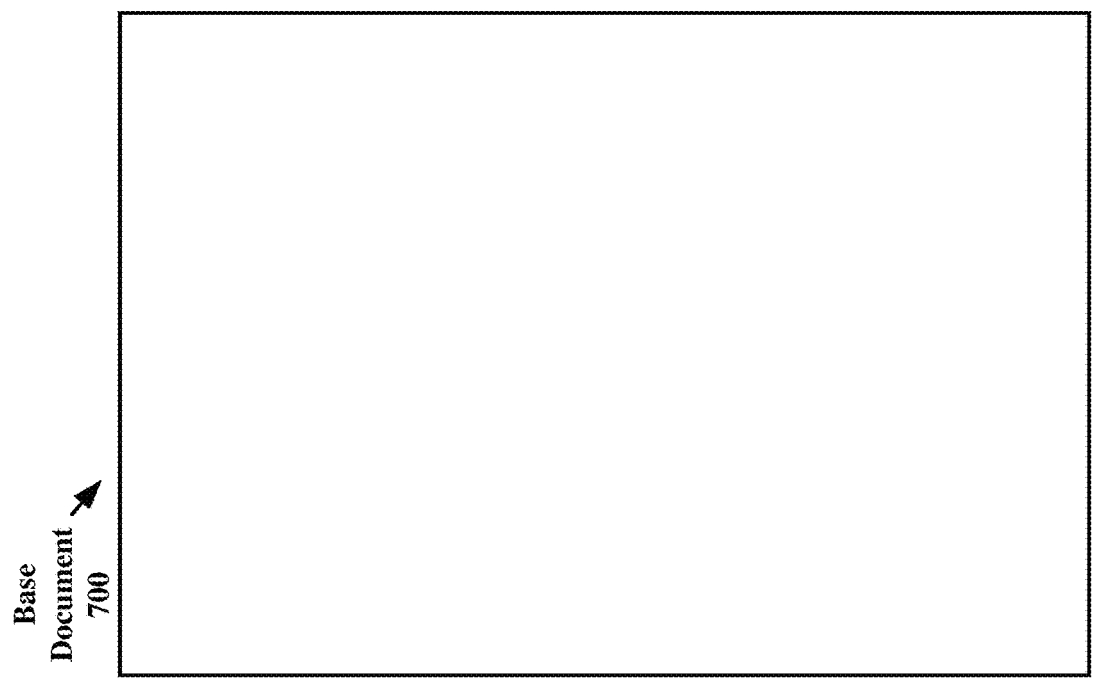
FIG. 7 is an illustration of an illustrative base document.

A base document (e.g., a PDF document) is then created in 224. An illustration of an illustrative base document 700 is provided in FIG. 7. At this time, the document does not have any content. In 226, the graphic represented by the bitmap image file is then drawn to the base document. An illustration of an illustrative base document 700' with the graphic represented by the bitmap image file drawn thereon is provided in FIG. 8. Notably, the graphic contains the non-text objects of the source document and watermark text merged together as a single digital image.

Next in 228, the text objects of the source document are drawn to the base document. The text objects may be drawn in a one-object-at-a-time fashion. In some scenarios, the order in which the text objects are drawn to the base document is determined based on queued information from a document object model. Alternatively, the order is arbitrarily determined or determined using a random or pseudo random number generator. An illustration of an illustrative base document 700" with the text objects drawn thereto is provided in FIG. 9. Techniques for drawing graphics, images, text and other objects to documents are well known in the art, and therefore will not be described herein. Any known or to be known technique for drawing objects to documents can be used herein without limitation.

Upon completing 228, the base document is output in 230 as a rendered secure document. The rendered secure document represents a watermarked version of the source document (e.g., as shown in FIG. 9). Notably, the rendered secure document is provided with a text selection capability. In effect, an end user can select text objects drawn thereto for a variety of purposes (e.g., highlighting text, crossing out text, and/or underlining text). Subsequently, 232 is performed where method 200 ends or other processing is performed.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for rendering a secure document with a text selection capability, comprising:
   determining, by a computing device, objects of a source document that are non-text objects and objects of the source document that are text objects;
   creating, by the computing device, an image file using the non-text objects of the source document, the image file including a graphic that merges together as a single image both (a) all of the non-text objects of the source document and (b) a watermark;
   drawing, by the computing device, the graphic of the image file onto a base document, the base document including a file format different than that of the source document; and
   drawing, by the computing device, the text objects from the source document onto the base document so as to create the secure document, the secure document configured to enable text selection while the watermark remains a part of the graphic that includes the non-text objects of the source document.

2. The method according to claim 1, wherein determining objects of the source document that are text non-text objects and object of the source document that are text objects comprise:
   creating, by the computing device, a document object model that comprises information about objects of the source document; and
   processing, by the computing device, the document object model to determine which objects of the source document are non-text objects.

3. The method according to claim 2, wherein the information comprises an object identifier, an object position in the source document, and a transformation matrix.

4. The method according to claim 2, further comprising queuing the information of the document object model which relates to the text objects of the source document prior to when the graphic is drawn to the base document.

5. The method according to claim 1, wherein the image file is a bitmap image file and the single image is a bitmap image.

6. The method according to claim 1, wherein the watermark comprises text.

7. The method according to claim 1, wherein the image file is created by:
   drawing the non-text objects to an electronic canvas from the source document;
   drawing the watermark to the electronic canvas; and
   storing a bitmap digital image of the electronic canvas consisting of the non-text images and watermark merged together as the single image.

8. The method according to claim 1, wherein the file format of the base document is a Portable Document Format ("PDF").

9. The method according to claim 1, wherein the text objects are drawn to the base document from the source document in a one-object-at-a-time manner.

10. The method according to claim 9, wherein the order in which the text objects are drawn to the base document is determined based on queued information from a document object model.

11. The method according to claim 1, wherein at least two of the non-text objects of the source document comprise are different types of non-text objects.

12. A system, comprising:
a processor; and
a non-transitory computer-readable storage medium comprising programming instructions that are configured to cause the processor to implement a method for rendering a secure document with a text selection capability, wherein the programming instructions comprise instructions to:
determining objects of a source document that are non-text objects and objects of the source document that are text objects;
creating an image file using the non-text objects of the source document, the image file including a graphic that merges together as a single image both (a) all of the non-text objects of the source document and (b) a watermark;
drawing the graphic of the image file onto a base document the base document including a file format different than that of the source document; and
drawing the text objects from the source document onto the base document so as to create the secure document, the secure document configured to enable text selection while the watermark remains a part of the graphic that includes the non-text objects of the source document.

13. The system according to claim 12, wherein determining objects of the source document that are text non-text objects and object of the source document that are text objects comprise:
creating a document object model that comprises information about objects of source document; and
processing the document object model to determine which objects of the source document are non-text objects.

14. The system according to claim 13, wherein the information comprises an object identifier, an object position in the source document, and a transformation matrix.

15. The system according to claim 13, wherein the programming instructions comprise instructions to queue the information of the document object model which relates to the text objects of the source document prior to when the graphic is drawn to the base document.

16. The system according to claim 12, wherein the image file is a bitmap image file and the single image is a bitmap image.

17. The system according to claim 12, wherein the watermark comprises text.

18. The system according to claim 12, wherein the image file is created by:

drawing the non-text objects to an electronic canvas from the source document;
drawing the watermark to the electronic canvas; and
storing a bitmap digital image of the electronic canvas consisting of the non-text images and watermark merged together as the single image.

19. The system according to claim 12, wherein the file format of the base document file format is a Portable Document Format ("PDF").

20. The system according to claim 12, wherein the text objects are drawn to the base document from the source document in a one-object-at-a-time manner.

21. The system according to claim 12, wherein the order in which the text objects are drawn to the base document is determined based on queued information from a document object model.

22. A method comprising:
generating, by a computing device, a document object model based on a source document, the document object model being indicative of non-text objects and text objects of the source document;
drawing, by the computing device, the non-text objects of the source document onto an electronic canvas based on information from the document object model;
drawing, by the computing device, a watermark onto the electronic canvas so that content of the electronic canvas includes both the non-text objects of the source document and the watermark;
creating, by the computing device, an image file of the content of the electronic canvas, the image file including a graphic that merges together into a single image that includes (a) all of the non-text objects of the source document and (b) the watermark;
generating, by the computing device, a base document using the created image file, the generation of the base document including (a) drawing of the graphic of the created image file onto the base document and (b) drawing the text objects of the source document onto the base document using the information from the document object model; and
providing, by the computing device, the base document as a watermarked version of the source document, the base document including a format different than that of the source document and configured to enable an end user to select text objects from within the base document while the watermark remains a part of the graphic that includes the non-text objects of the source document.

23. The method according to claim 22, wherein the text objects are drawn to the base document of the source document in a one-object-at-a-time manner.

24. The method according to claim 23, wherein the order in which the text objects are drawn to the base document is determined based on queued information from a document object model.

* * * * *